(12) United States Patent
Bai et al.

(10) Patent No.: US 11,073,257 B2
(45) Date of Patent: Jul. 27, 2021

(54) LIGHT AMOUNT ADJUSTMENT DEVICE, IMAGING DEVICE, IMAGING SYSTEM AND MOVING OBJECT

(71) Applicant: SZ DJI TECHNOLOGY CO., LTD., Shenzhen (CN)

(72) Inventors: Longji Bai, Shenzhen (CN); Takashi Koyama, Shenzhen (CN); Yongwang Xu, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/672,013

(22) Filed: Nov. 1, 2019

(65) Prior Publication Data
US 2020/0173633 A1 Jun. 4, 2020

Related U.S. Application Data

(63) Continuation of application No. PCT/JP2017/017608, filed on May 9, 2017.

(51) Int. Cl.
| | |
|---|---|
| *F21V 11/10* | (2006.01) |
| *G03B 9/06* | (2021.01) |
| *F21V 14/08* | (2006.01) |
| *F21S 41/695* | (2018.01) |
| *B64C 39/02* | (2006.01) |
| *F21W 107/30* | (2018.01) |

(52) U.S. Cl.
CPC ............ *F21V 14/08* (2013.01); *B64C 39/024* (2013.01); *F21S 41/695* (2018.01); *F21V 11/10* (2013.01); *G03B 9/06* (2013.01)

(58) Field of Classification Search
CPC .................................. G03B 9/02; G03B 9/06
See application file for complete search history.

(56) References Cited

U.S. PATENT DOCUMENTS

| 5,333,024 A | 7/1994 | Labaziewicz | |
|---|---|---|---|
| 5,365,298 A * | 11/1994 | Fox | G03B 9/22 396/453 |
| 5,926,663 A * | 7/1999 | Suzuki | G03B 9/06 396/449 |

(Continued)

FOREIGN PATENT DOCUMENTS

| CN | 1442707 A | 9/2003 |
|---|---|---|
| CN | 1512257 A | 7/2004 |

(Continued)

OTHER PUBLICATIONS

The World Intellectual Property Organization (WIPO) International Search Report for PCT/JP2017/017608 dated Aug. 15, 2017 5 pages.

*Primary Examiner* — Noam Reisner
(74) *Attorney, Agent, or Firm* — Anova Law Group, PLLC

(57) ABSTRACT

A light amount adjustment device includes a base member, a rotation member rotatably held with respect to the base member, and a light amount adjustment member engaged with the rotation member and configured to be driven by the rotation member to adjust an amount of passing light. The rotation member includes a first surface area in contact with the base member and a second surface area not in contact with the base member. A surface roughness of the first surface area is greater than a surface roughness of the second surface area.

11 Claims, 9 Drawing Sheets

(56) References Cited

U.S. PATENT DOCUMENTS

2012/0287516 A1\* 11/2012 Nakajima ................ G03B 9/06
                                                                                                                359/738

FOREIGN PATENT DOCUMENTS

| CN | 102466943 A | 5/2012 |
|----|-------------|--------|
| JP | H04139427 A | 5/1992 |
| JP | H07005523 A | 1/1995 |
| JP | H07181559 A | 7/1995 |
| JP | 2002090796 A | 3/2002 |
| JP | 2007086547 A | 4/2007 |
| JP | 2012145929 A | 8/2012 |
| JP | 5368697 B2 | 12/2013 |
| JP | 6024074 B1 | 11/2016 |

\* cited by examiner

100

LIGHT AMOUNT ADJUSTMENT DEVICE, IMAGING DEVICE, IMAGING SYSTEM AND MOVING OBJECT

CROSS-REFERENCE TO RELATED APPLICATION

This application is a continuation of International Application No. PCT/JP2017/017608, filed May 9, 2017, the entire content of which is incorporated herein by reference.

FIELD

The present disclosure relates to a light amount adjustment device, an imaging device, an imaging system and a moving object.

BACKGROUND

Patent Document 1 discloses a blade surface on a drive ring side of a light-shielding blade being supported by a blade-supporting portion of the drive ring, and thus, the contact area between the rotating light-shielding blade and the rotating drive ring being reduced and the frictional resistance, which is received by the light-shielding blade, from the drive ring is reduced.

Patent Document 1: JP-A-2012-145929

A member for adjusting the amount of light, i.e. a diaphragm or the like, included in an imaging device may move due to impact, such that in some cases, the amount of light cannot be appropriately controlled.

SUMMARY

A light amount adjustment device according to an aspect of the present disclosure may include a rotation member. The light amount adjustment device may include a light amount adjustment member which is engaged with the rotation member and which is driven by the rotation of the rotation member to adjust the amount of light passing through. The rotation member may include a main body portion. The rotation member may include a gear portion which is provided on the main body portion and which is configured to receive a driving force from a driving source. The rotation member may include a weight portion provided on the main body portion. The position of the combined center of gravity of the main body portion, the gear portion and the weight portion may be closer to a rotation shaft of the rotation member than the position of the combined center of gravity of the main body portion and the gear portion.

The distance between a line, obtained by projecting a vertical line passing through the center of gravity of the rotation member onto a plane perpendicular to the rotation shaft of the rotation member, and an intersection point of the plane and the rotation shaft of the rotation member may be shorter than the distance between a line, obtained by projecting a horizontal line passing through the center of gravity of the rotation member onto the plane, and the intersection point.

The position of the center of gravity of the rotation member may be on the rotation shaft of the rotation member.

The gear portion may include a punched portion.

The light amount adjustment device may further include a base member. The rotation member may be rotatably held with respect to the base member. The surface roughness of a first surface area, which is in contact with the base member, of the rotation member may be greater than the surface roughness of a second surface area, which is not in contact with the base member, of the rotation member.

The rotation member may be plate-shaped. The rotation member may be provided between the base member and the light amount adjustment member. The first surface area of the rotation member may include a surface facing the base member.

The rotation member may be plate-shaped. The rotation member may be provided between the base member and the light amount adjustment member. The second surface area of the rotation member may include a surface facing the light amount adjustment member.

The base member may include a protrusion portion, to which the rotation member is rotatably fitted. The rotation member may be plate-shaped. The rotation member may be rotatably fitted to the protrusion portion of the base member. The first surface area of the rotation member may include a surface facing the protrusion portion of the base member.

The light amount adjustment device may include an elastic member for energizing the rotation member.

The elastic member may press the first surface area of the rotation member against the base member.

The base member may include a recessed portion that rotatably accommodates the rotation member. The elastic member may be provided between a side wall of the recessed portion and a side surface which faces the side wall of the recessed portion, of the rotation member.

The base member may include a holding portion that rotatably clamps and holds the rotation member. The elastic member may be provided between the holding portion and the rotation member.

The rotation member may be provided between the base member and the light amount adjustment member. The rotation member may be a plate-shaped annular member including an opening portion. The base member may include a recessed portion that rotatably accommodates the rotation member. The base member may include a protrusion portion that is provided on the recessed portion and that protrudes from a bottom surface of the recessed portion so as to be rotatably fitted to the opening portion. The first surface area of the rotation member may include a surface facing the protrusion portion of the base member. The elastic member may be provided between a side wall of the recessed portion and a side surface, which faces the side wall of the recessed portion, of an outer circumferential side of the rotation member.

The rotation member may be provided between the base member and the light amount adjustment member. The rotation member may be a plate-shaped annular member including an opening portion. The base member may include a recessed portion that rotatably accommodates the rotation member. The base member may include a protrusion portion that is provided on the recessed portion and that protrudes from a bottom surface of the recessed portion so as to be rotatably fitted to the opening portion. The base member may include a holding portion that is provided on the protrusion portion and rotatably clamps and holds the rotation member. The first surface area of the rotation member may include a surface facing the base member. The elastic member may be provided between the holding portion and the rotation member.

The light amount adjustment member may be a diaphragm portion including a plurality of diaphragm blades.

An imaging device according to an aspect of the present disclosure may include the light amount adjustment device.

The imaging device may include an image sensor configured to form an image of light passing through the light amount adjustment device.

An imaging system according to an aspect of the present disclosure may include the imaging device described above. The imaging system may include a supporting mechanism configured to support the imaging device.

A moving object according to an aspect of the present disclosure may include the imaging system described above.

According to an aspect of the present disclosure, the light amount not being able to be properly controlled because the light amount adjustment member is driven due to the unnecessary rotation of the rotation member can be prevented.

The above summary of the disclosure does not enumerate all the features of the present disclosure. Sub-combinations of these feature groups may also be embodiments of the disclosure.

DESCRIPTION OF EMBODIMENTS

Figure 1:
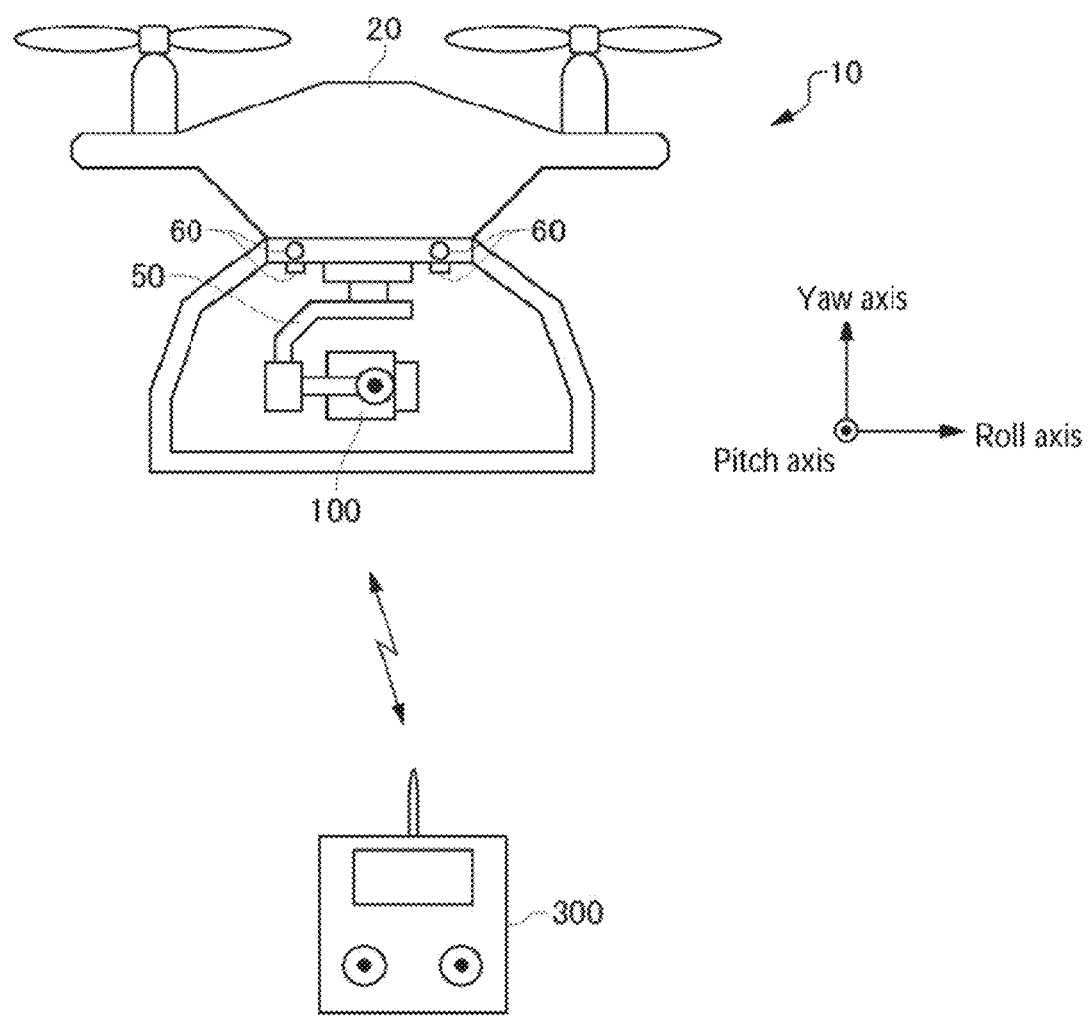
FIG. 1 is a diagram showing an example of the appearances of an unmanned aerial vehicle and a remote control device.

Hereinafter, the present disclosure will be described through embodiments of the present disclosure, but the following embodiments are not intended to limit the invention according to the claims. In addition, all combinations of features described in the embodiments are not necessarily indispensable for the solution means of the disclosure. It will be apparent to those skilled in the art that various modifications or improvements can be made with regard to the following embodiments. It is apparent from the description of the scope of the disclosure that modes with such modifications or improvements can be included in the technical scope of the present disclosure.

The claims, description, drawings, and abstract include matters subject to copyright protection. The copyright holder does not object to the copying, by any person, of these documents, as long as the documents are shown in the file or record of the Patent Office. However, in all other cases, all copyrights are reserved.

Various embodiments of the present disclosure may be described with reference to a flow chart and a block diagram, wherein the block diagram may indicate: (1) a stage of a process in which operations are performed; or (2) a "portion" of a device that is responsible for performing the operations. A particular stage and "portion" may be implemented by a programmable circuit and/or a processor. A dedicated circuit may include a digital and/or analogue hardware circuit. An integrated circuit (IC) and/or discrete circuit may also be included. The programmable circuit may include a reconfigurable hardware circuit. The reconfigurable hardware circuit may include a logical AND, a logical OR, a logical XOR, a logical NAND, a logical NOR and other logic operations, and memory elements such as a flip-flop, a register, a field programmable gate array (FPGA), and a programmable logic array (PLA).

A computer readable medium may include any tangible device capable of storing instructions executed by a suitable device. As a result, a computer readable medium having instructions stored therein will include a product including instructions that can be executed to create means for performing the operations specified in the flowchart or block diagram. Examples of the computer readable medium may include an electronic storage medium, a magnetic storage medium, an optical storage medium, an electromagnetic storage medium, a semiconductor storage medium or the like. More specific examples of the computer readable medium may include a Floppy (a registered trademark) disk, a diskette, a hard disk, a random access memory (RAM), a read-only memory (ROM), an erasable programmable read-only memory (EPROM or a flash memory), an electrically erasable programmable read-only memory (EEPROM), a static random access memory (SRAM), a compact disc read-only memory (CD-ROM), a digital versatile disc (DVD), a Blu-ray™ disc, a memory stick, an integrated circuit card or the like.

Computer-readable instructions may include either a source code or object code described in any combination of one or more programming languages. The source code or object code includes conventional procedural programming languages. The conventional procedural programming language may include an assembler instruction, an instruction set architecture (ISA) instruction, a machine instruction, a machine-dependent instruction, a microcode, a firmware instruction, state setting data, or an object-oriented programming language such as Smalltalk, JAVA (a registered trademark), C++, and a "C" programming language or similar programming language. The computer-readable instructions may be provided locally or via a wide area network (WAN), such as a local area network (LAN), the Internet, etc. to a processor or a programmable circuit of a general purpose computer, a special-purpose computer or other programmable data processing devices. The processor or programmable circuit may execute the computer-readable instructions to create means for performing the operations specified in the flowchart or block diagram. Examples of the processor include a computer processor, a processing unit, a microprocessor, a digital signal processor, a controller, a microcontroller, or the like.

FIG. 1 shows an example of the appearances of an unmanned aerial vehicle (UAV) 10 and a remote control device 300. The UAV 10 includes a UAV main body 20, a gimbal 50, a plurality of imaging devices 60, and an imaging device 100. The gimbal 50 and the imaging device 100 are respectively examples of an imaging system. The UAV 10 is an example of a moving object propelled by a propulsion portion. The moving object refers to a concept including, in addition to the UAV, an aircraft such as another aircraft moving in the air, a vehicle moving on the ground, a ship moving on water, or the like.

The UAV main body 20 includes a plurality of rotating wings. The plurality of rotating wings are examples of the propulsion portion. The UAV main body 20 causes the UAV 10 to fly by controlling the rotation of the plurality of rotating wings. The UAV main body 20, for example, uses four rotating wings to fly the UAV 10. The number of rotating wings is not limited to four. In addition, the UAV 10 may be a fixed wing machine without rotating wings.

The imaging device 100 is a camera for imaging a subject within a desired imaging range. The gimbal 50 supports the imaging device 100 so that a posture of the imaging device 100 can be changed. The gimbal 50 rotatably supports the imaging device 100. The gimbal 50 is an example of a supporting mechanism. For example, the gimbal 50 supports, by using an actuator, the imaging device 100 so same can rotate around a pitch axis. The gimbal 50 supports the imaging device 100 so same can further rotate around the center of a roll axis and a yaw axis by using the actuator. The gimbal 50 causes the imaging device 100 to rotate around at least one of the yaw axis, the pitch axis, or the roll axis, and thus, the posture of the imaging device 100 may be changed.

The plurality of imaging devices 60 are sensing cameras for imaging surroundings of the UAV 10 in order to control the flight of the UAV 10. Two imaging devices 60 may be provided on a front surface, i.e., a nose, of the UAV 10. Another two imaging devices 60 may be provided on a bottom surface of the UAV 10. The two imaging devices 60 on the front side are paired and may function as a so-called stereo camera. The two imaging devices 60 on the bottom side are also paired and may function as a so-called stereo camera. Based on images imaged by the plurality of imaging devices 60, three-dimensional spatial data around the UAV 10 may be generated. The number of imaging devices 60 included in the UAV 10 is not limited to four. The UAV 10 may include at least one imaging device 60. The UAV 10 may include at least one imaging device 60 on the nose, a tail, a side surface, the bottom surface, and a ceiling surface of the UAV 10 separately. An angle of view that can be set by an imaging device 60 may be wider than an angle of view set by the imaging device 100. That is, the imaging range of the imaging device 60 may be wider than the imaging range of the imaging device 100. The imaging device 60 may include a single-focus lens or a fisheye lens.

The remote control device 300 communicates with the UAV 10 and remotely controls the UAV 10. The remote control device 300 may communicate with the UAV 10 in a wireless manner. The remote control device 300 transmits, to the UAV 10, driving information indicating various driving instructions relating to the movement of the UAV 10, such as upward movement, downward movement, acceleration, deceleration, forward movement, backward movement and rotation. The driving information includes driving information about increasing the height of the UAV 10, for example. The driving information may indicate the height at which the UAV 10 should be located. The UAV 10 moves so as to be located at the height indicated by the driving information received from the remote control device 300.

Figure 2:
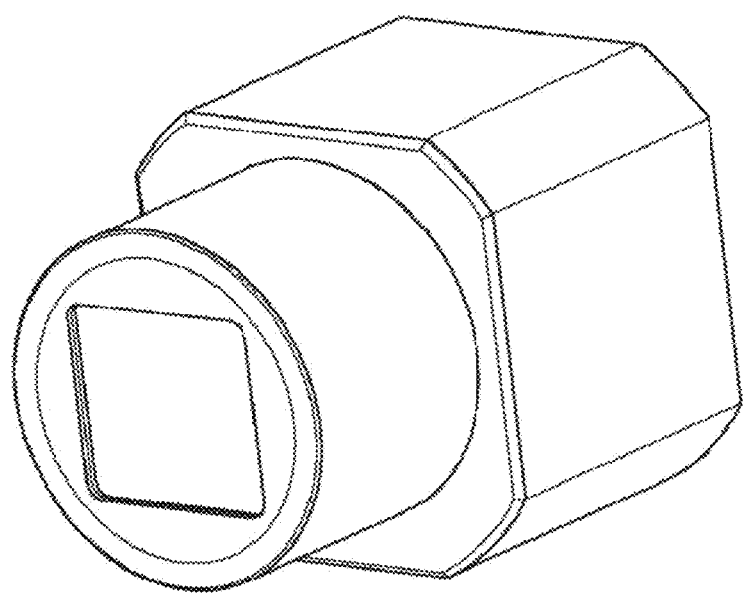
FIG. 2 is a diagram showing an example of an external perspective view of an imaging device.

FIG. 2 shows an example of an external perspective view of the imaging device 100. Depending on the usage environment, the imaging device 100 may receive a relatively large impact. For example, when the UAV 10 lands or the like, the imaging device 100 mounted on the UAV 10 easily receives a relatively large impact. Due to such an impact, a member for adjusting the amount of light, i.e. a diaphragm or the like, included in the imaging device 100, may move, such that in some cases, the amount of light cannot be appropriately controlled.

Figure 3:
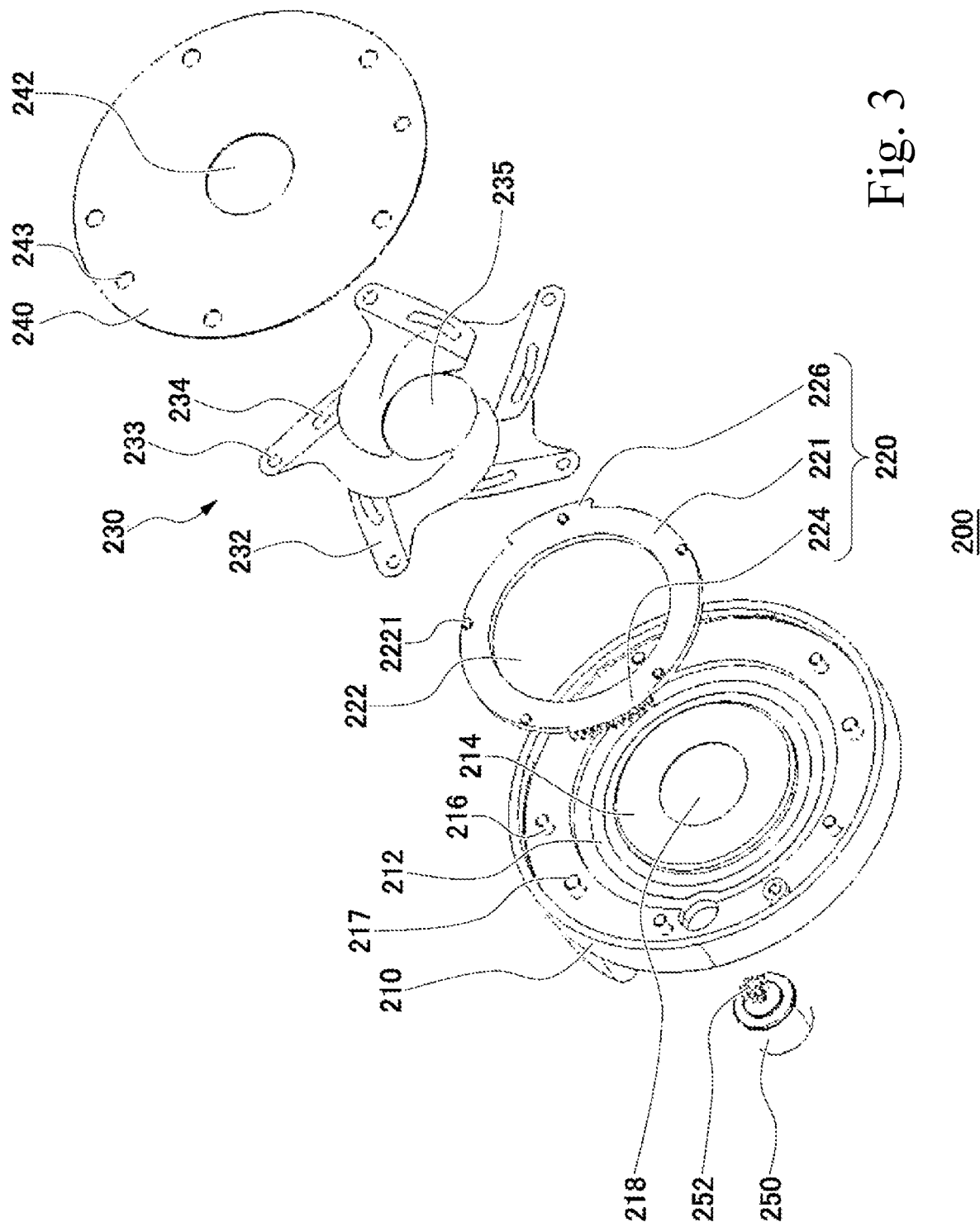
FIG. 3 is a diagram showing an example of an exploded perspective view of a light amount adjustment device.
Figure 4:
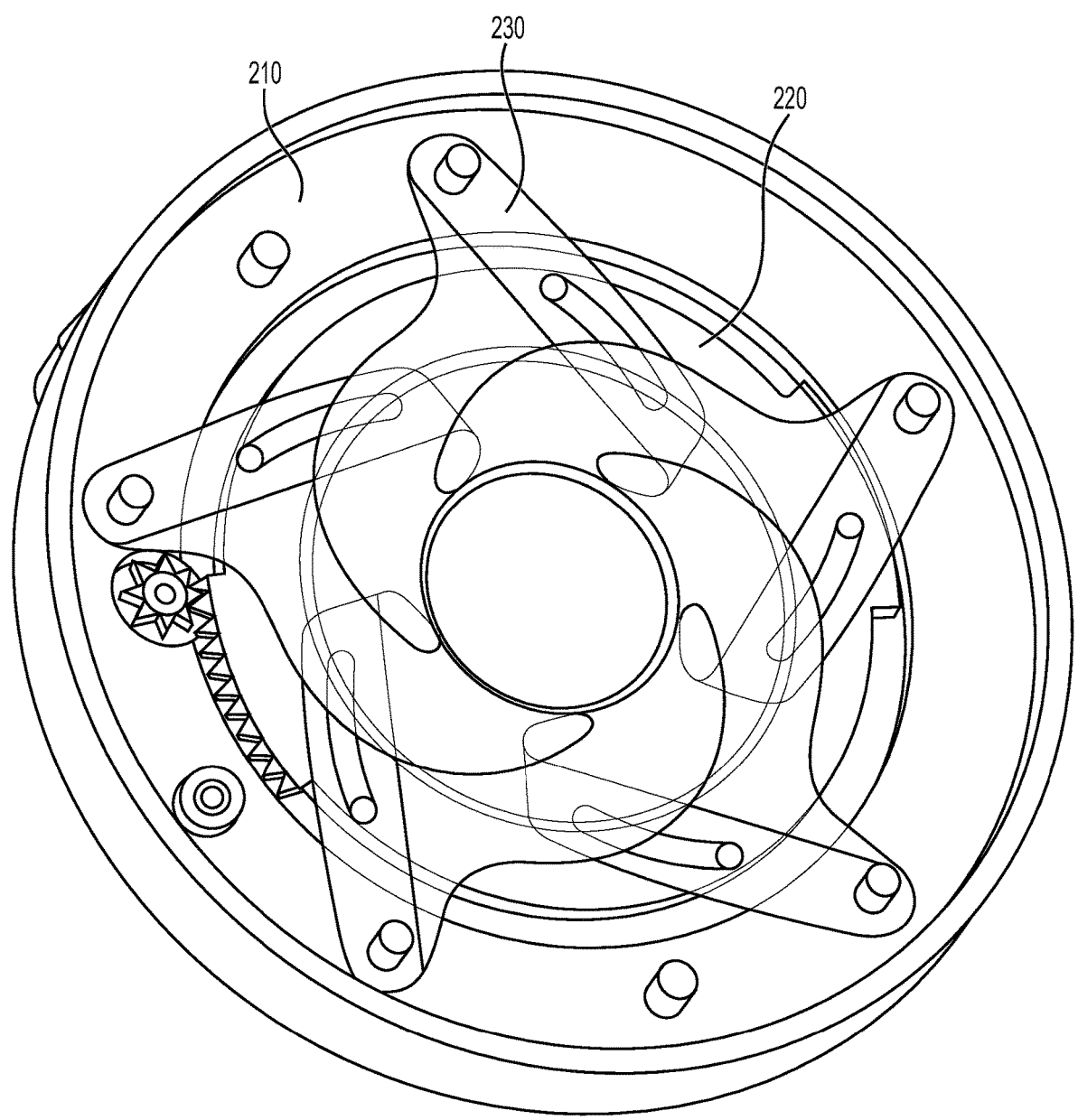
FIG. 4 shows an example of an external perspective view of the light amount adjustment device when a cover is removed.

FIG. 3 shows an example of an exploded perspective view of a light amount adjustment device 200. FIG. 4 shows an example of an external perspective view of the light amount adjustment device 200 when a cover 240 is removed.

The light amount adjustment device 200 may be provided on the imaging device 100. The light amount adjustment device 200 may be provided on the imaging device 60. The light amount adjustment device 200 includes a base member 210, a rotation member 220, a diaphragm portion 230, the cover 240, and a step motor 250. The rotation member 220 is rotatably held with respect to the base member 210. The rotation member 220 is provided between the base member 210 and the diaphragm portion 230. The rotation member 220 is a plate-shaped annular member including an opening portion 222. The rotation member 220 includes an annular main body portion 221, and a gear portion 224 configured to receive a driving force from the step motor 250. The base member 210 includes a recessed portion 212 that rotatably accommodates the rotation member 220. The base member 210 includes a protrusion portion 214, to which the rotation member 220 is rotatably fitted. The protrusion portion 214 is provided on the recessed portion 212 and protrudes from a bottom surface of the recessed portion 212 so as to be rotatably fitted to the opening portion 222 of the rotation member 220. The protrusion portion 214 includes an opening portion 218, through a central portion of which light passes.

The diaphragm portion 230 is engaged with the rotation member 220, and is driven by the rotation of the rotation member 220 as a result of same receiving the driving force from the step motor 250, and is configured to adjust the amount of passing light. The diaphragm portion 230 is an example of a light amount adjustment member. The diaphragm portion 230 includes a plurality of diaphragm blades 232. A diaphragm blade 232 includes a through hole 233 and a guide groove 234. A supporting pin 216 provided on the base member 210 is inserted into the through hole 233, and thus, the diaphragm blade 232 is rotatably supported on the base member 210. A guide pin 2221 provided on the rotation member 220 is guided by the guide groove 234. A diaphragm aperture 235 is respectively formed by inner edges of the plurality of diaphragm blades 232 when the plurality of diaphragm blades 232 are overlapped. In response to the rotation of the rotation member 220 as a result of same receiving the driving force from the step motor 250, the guide pin 2221 moves along the guide groove 234. Accordingly, the diaphragm blade 232 rotates around the through hole 233, and the size of the diaphragm aperture 235 changes.

The cover 240 is fixed to the base member 210 when the rotation member 220 and the diaphragm portion 230 are sandwiched between the cover and the base member 210. The cover 240 includes a through hole 243. The base member 210 includes a fixed pin 217, the fixed pin 217 is inserted in the through hole 243, and thus, the cover 240 is positioned and fixed with respect to the base member 210. The step motor 250 includes a gear portion 252 on a drive shaft. The step motor 250 is held on the base member 210. The gear portion 224 of the rotation member 220 is engaged with the gear portion 252, and the step motor 250 is driven so as to rotate the rotation member 220.

Here, in order to prevent the rotation member 220 from rotating as a result of receiving an impact or the like, bringing the step motor 250 into an energized state in advance is decided upon. However, in order to bring the step motor 250 into an energized state in advance, power is required. Under an environment in which the UAV 10 or the like is subject to a relatively large impact, when the imaging device 100 is used, there is a possibility that a relatively large amount of electric power must be continuously supplied to the step motor 250 in order to prevent the rotation member 220 from moving due to the impact. On the other hand, for example, where it is desirable for a device is to be able to continue driving with limited power, such as in the case of the UAV 10, it is desirable for the power consumption to be suppressed as much as possible. Therefore, in the light amount adjustment device 200 according to the present embodiment, when the power consumption is suppressed, the rotation member 220 is prevented from rotating due to the impact.

Here, if the center of gravity of the rotation member 220 is close to the rotation shaft of the rotation member 220, it is difficult for the rotation member 220 is difficult. However, as described above, in addition to the main body portion 221, the rotation member 220 includes the gear portion 224. Since the gear portion 224 is provided, there is a possibility that the center of gravity of the rotation member 220 is displaced from the rotating shaft. Therefore, the rotation member 220 according to the present embodiment further includes a weight portion 226 provided on the main body portion 221. The weight portion 226 may be provided in consideration of a weight of the gear portion 224. The weight portion 226 may be provided at a position facing the gear portion 224 sandwiching the opening portion 222. The weight of the weight portion 226 may be the same as the weight of the gear portion 224. Since the weight portion 226 is provided, the center of gravity of the rotation member 220 is close to the rotation shaft of the rotation member 220. The position of the combined center of gravity of the main body portion 221, the gear portion 224 and the weight portion 226 is closer to the rotation shaft of the rotation member 220 than the position of the combined center of gravity of the main body portion 221 and the gear portion 224. The position of the center of gravity of the rotation member 220 may be on or close to the rotation shaft of the rotation member. The weight portion 226 includes a plurality of small pieces, and the plurality of small pieces may be scattered in the main body portion 221.

Figure 5:
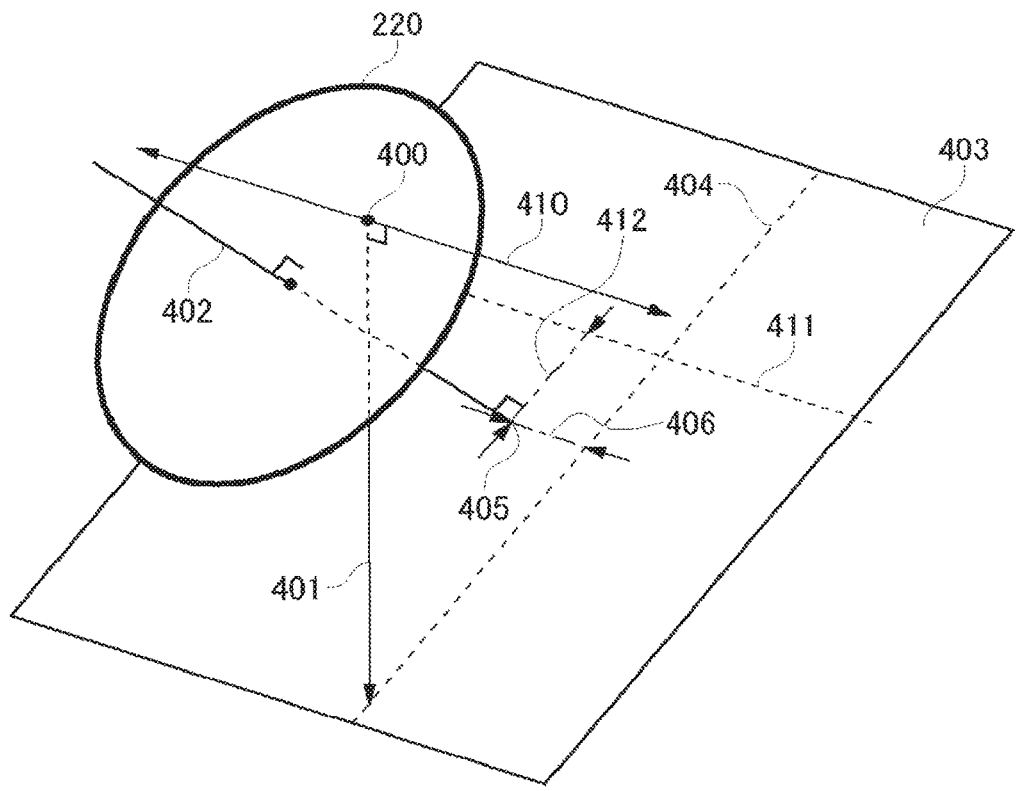
FIG. 5 is diagram for illustrating a positional relationship between a rotation shaft of a rotation member and the center of gravity thereof.

The imaging device 100 may be used in a posture in which an optical axis is not oriented in a horizontal direction. Even in this case, if the position of the center of gravity of the rotation member 220 is on or close to the rotation shaft of the rotation member, it may be difficult for the rotation member 220 to rotate due to the impact or the like. In addition, as shown in FIG. 5, the distance 406 between a line 404, obtained by projecting a vertical line 401 passing through the center of gravity 400 of the rotation member 220 onto a plane 403 perpendicular to a rotation shaft 402 of the rotation member 220, and an intersection point 405 of the plane 403 and the rotation shaft 402 of the rotation member 220 may be shorter than the distance 412 between a line 411, obtained by projecting a horizontal line 410 passing through the center of gravity 400 of the rotation member 220 onto the plane 403, and the intersection point 405. Accordingly, it may be difficult for the rotation member 220 to rotate due to the impact or the like.

In addition to adjusting the position of the center of gravity of the rotation member 220, it may be made difficult for the rotation member 220 to rotate with respect to the base member 210. In order to make it difficult for the rotation member 220 to rotate with respect to the base member 210, the surface roughness of a first surface area, which is in contact with the base member 210, of the rotation member 220 may be greater than the surface roughness of a second surface area, which is not in contact with the base member 210, of the rotation member 220. Since the surface, which is in contact with the base member 210, of the rotation member 220 is a rough surface, it may be difficult for the rotation member 220 to rotate with respect to the base member 210.

Figure 6:
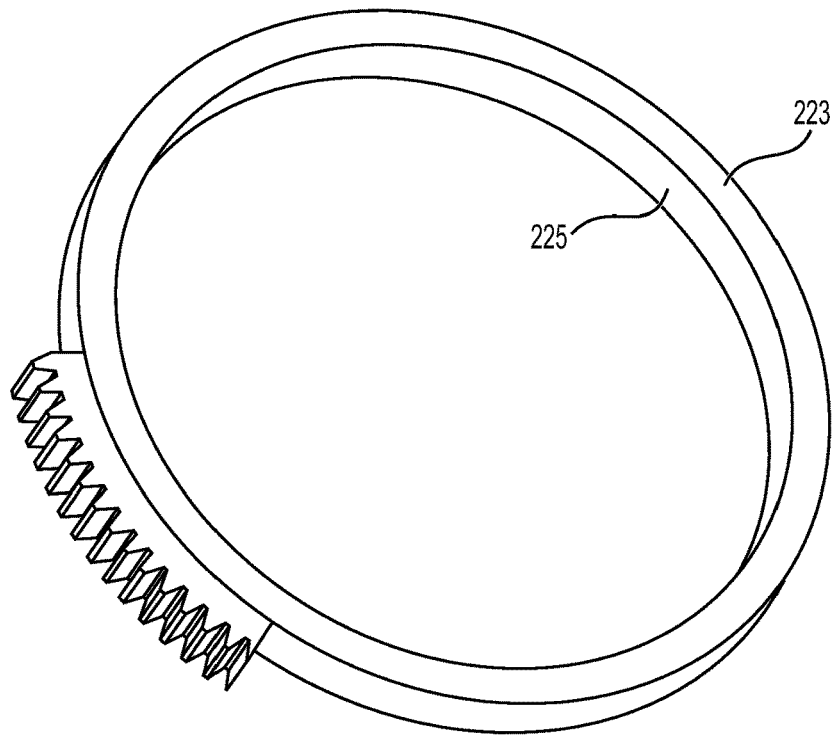
FIG. 6 is a diagram showing an example of an external perspective view of the rotation member.

FIG. 6 shows an example of a perspective view of the rotation member 220 as viewed from a side facing the base member 210. The first surface area of the rotation member 220 may include a surface 223 facing the base member 210. The first surface area may be at least a part of the surface 223. The first surface area of the rotation member 220 may include a surface 225 facing the protrusion portion 214 of the base member 210. The first surface area may be at least a part of the surface 225. The first surface area may be at least a part of the surface 223 and the surface 225. The second surface area of the rotation member 220 may include a surface (a surface on a back side of the surface 223) facing the diaphragm portion 230.

Figure 7:
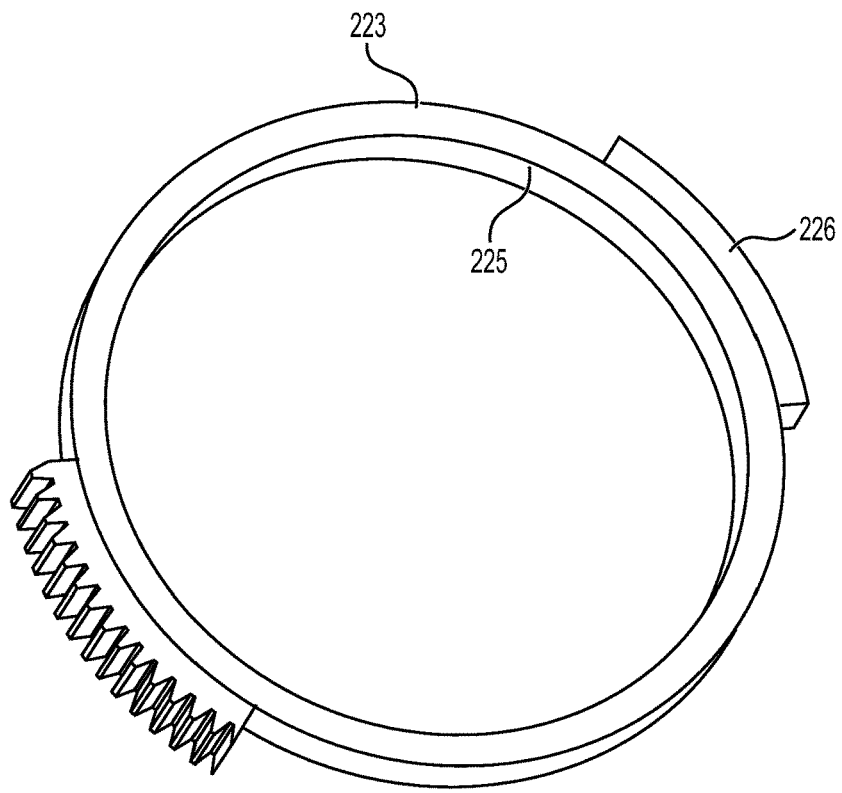
FIG. 7 is a diagram showing an example of the external perspective view of the rotation member.
Figure 8:
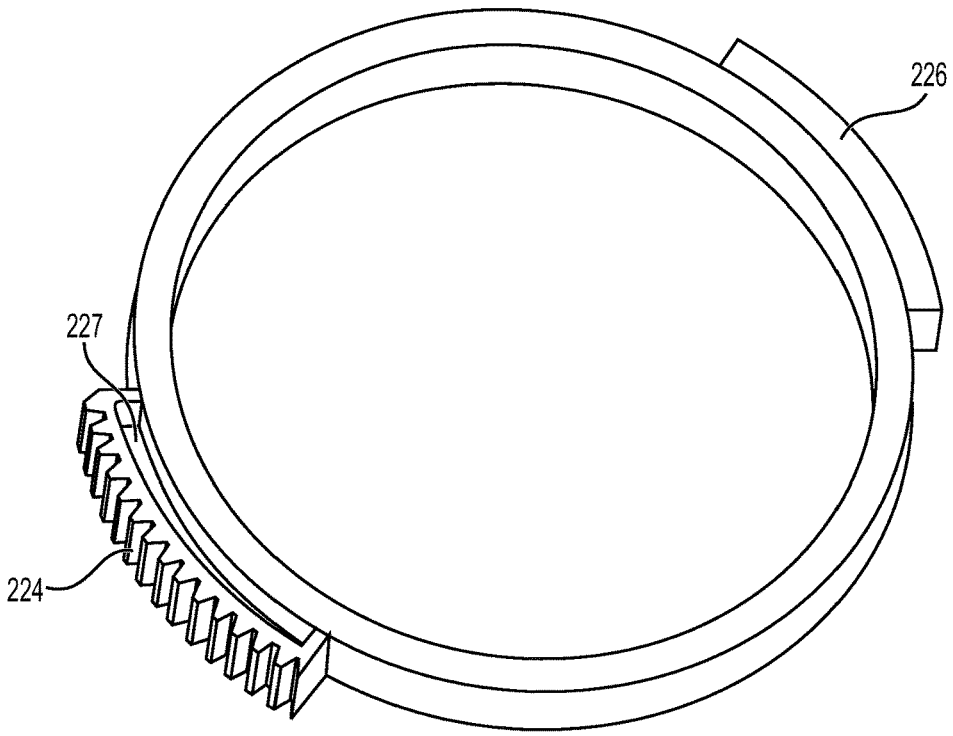
FIG. 8 is a diagram showing an example of the external perspective view of the rotation member.

As shown in FIG. 7, in addition to making the surface 223 and the surface 225 be in contact with the base member 210 of the rotation member 220 as rough surfaces, the rotation member 220 may include the weight portion 226. As shown in FIG. 8, the gear portion 224 may include a punched portion 227. Since the punched portion 227 is formed on the gear portion 224, the weight of the gear portion 224 can be reduced and the weight of the weight portion 226 can also be reduced. Since the punched portion 227 is formed on the gear portion 224, it is possible to prevent the occurrence of so-called "sinking", i.e. indentations, depressions, etc. in the gear portion 224, due to the shrinkage, during moulding, of the rotation member 220.

Figure 9:
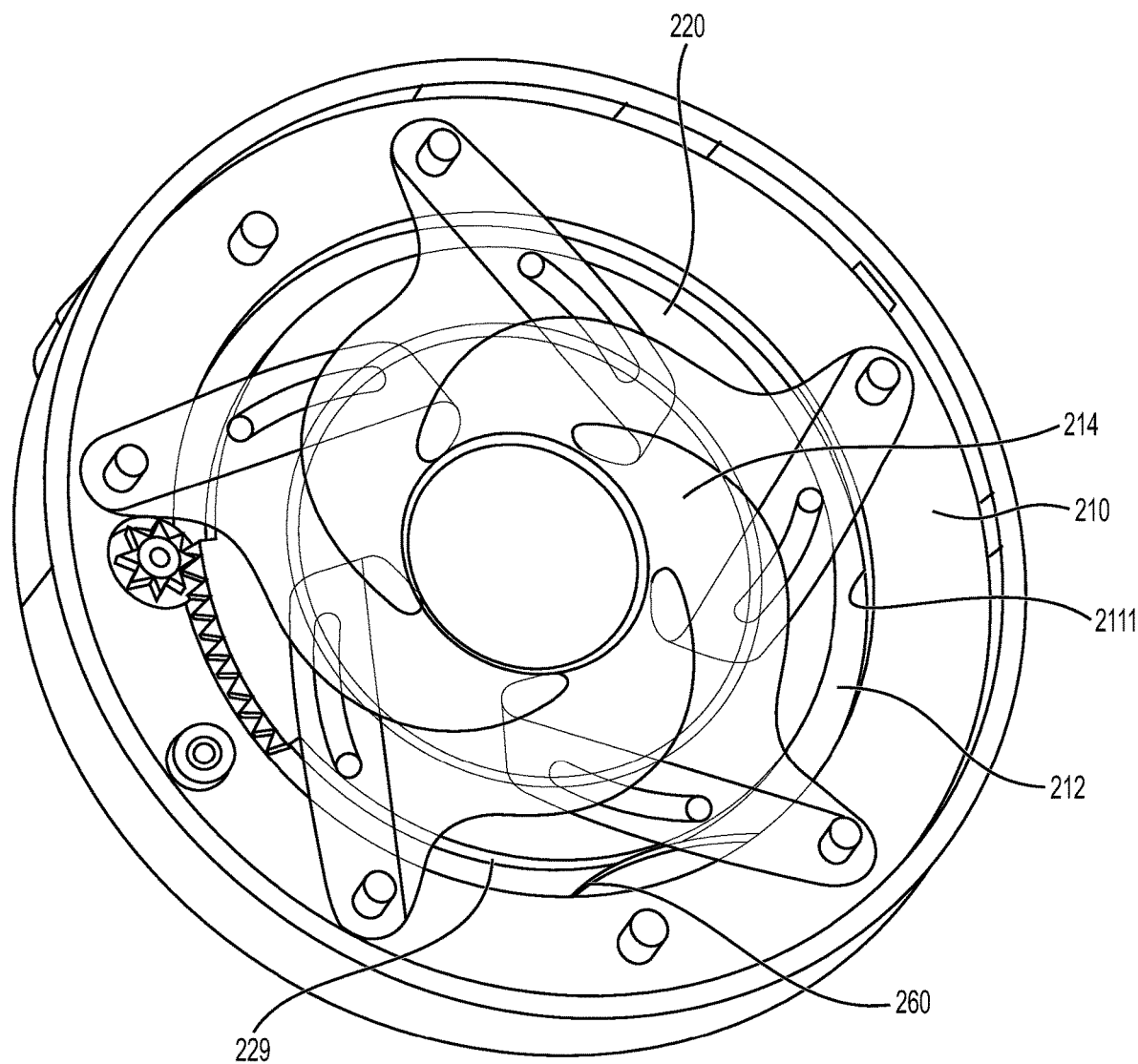
FIG. 9 shows an example of the external perspective view of the light amount adjustment device in the state where the cover is removed.

In addition to providing the weight portion 226 on the rotation member 220, since the light amount adjustment device 200 includes an elastic member for energizing the rotation member 220, the rotation of the rotation member 220 may be suppressed. The elastic member may press the first surface area, which has a rough surface, of the rotation member against the base member 210. The elastic member may be provided between a side wall of the recessed portion 212 and a side surface which faces the side wall of the recessed portion 212, of the rotation member 220. For example, as shown in FIG. 9, an elastic member 260 may be provided between a side wall 2111 of the recessed portion 212 and a side surface 229 which faces the side wall 2111 of the recessed portion 212, of the rotation member 220. The elastic member 260 may press the surface facing the protrusion portion 214 of the base member 210 against a side surface on an outer side of the protrusion portion 214 of the base member 210. The elastic member for energizing the rotation member 220 may be provided at another position as long as the rotation of the rotation member 220 is suppressed.

Figure 10:
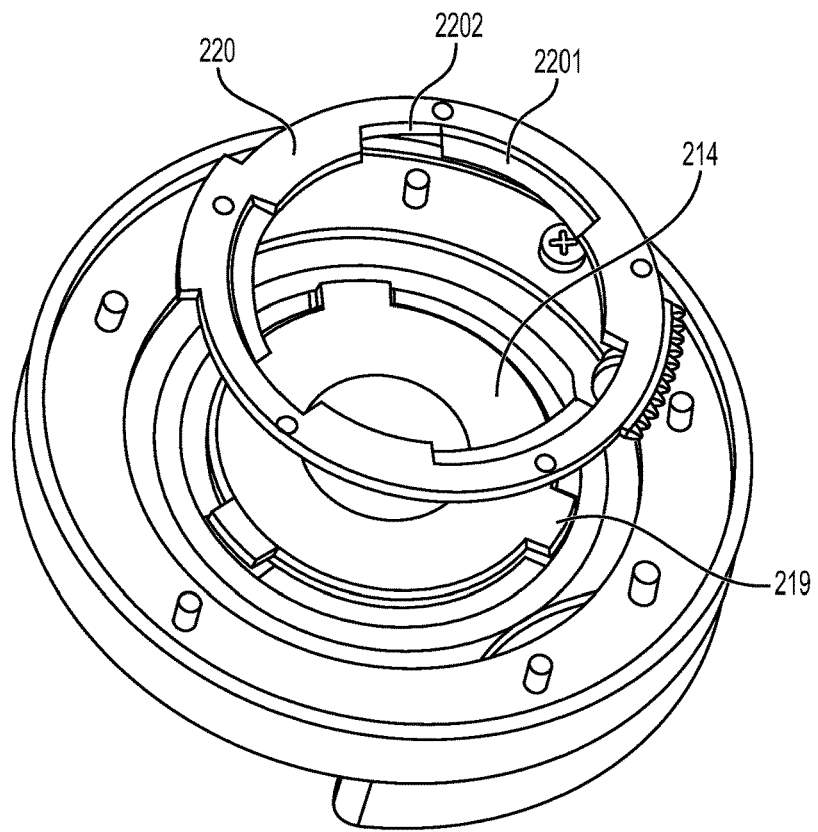
FIG. 10 is a diagram showing an example of an exploded perspective view of a base member and a rotation member.
Figure 11:
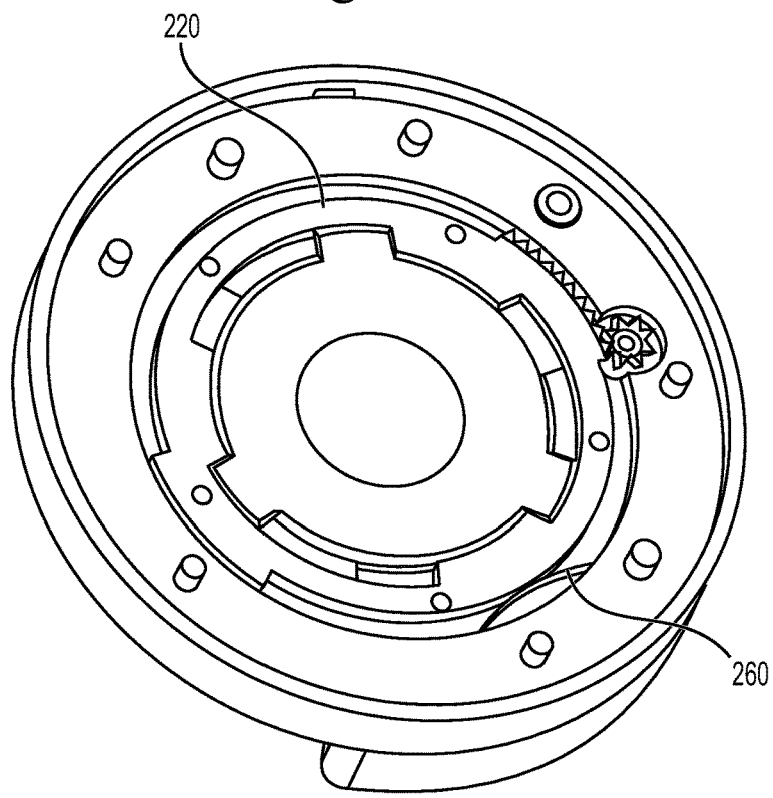
FIG. 11 is a diagram showing an example of an external perspective view of the base member, on which the rotation member is mounted.

As shown in FIG. 10, the base member 210 may include a holding portion 219 that rotatably clamps and holds the rotation member 220. The holding portion 219 may be provided on the protrusion portion 214. The holding portion 219 may be formed so as to protrude from the side surface on the outer side of the protrusion portion 214. A plurality of holding portions 219 may be provided on the protrusion portion 214. The plurality of holding portions 219 may be radially provided on the protrusion portion 214. The rotation member 220 may include a flange portion 2201 that is engaged with the holding portion 219 on an inner side surface. The holding portion 219 and the flange portion 2201 may function as a so-called bayonet mechanism. The rotation member 220 may include a notch portion 2202 that is connected with the flange portion 2201 on an inner side surface. The rotation member 220 is accommodated in the recessed portion 212 via the notch portion 2202 and rotates, and is thus rotatably held by the base member 210. FIG. 11 shows a state where the rotation member 220 is accommodated in the recessed portion 212.

Figure 12:
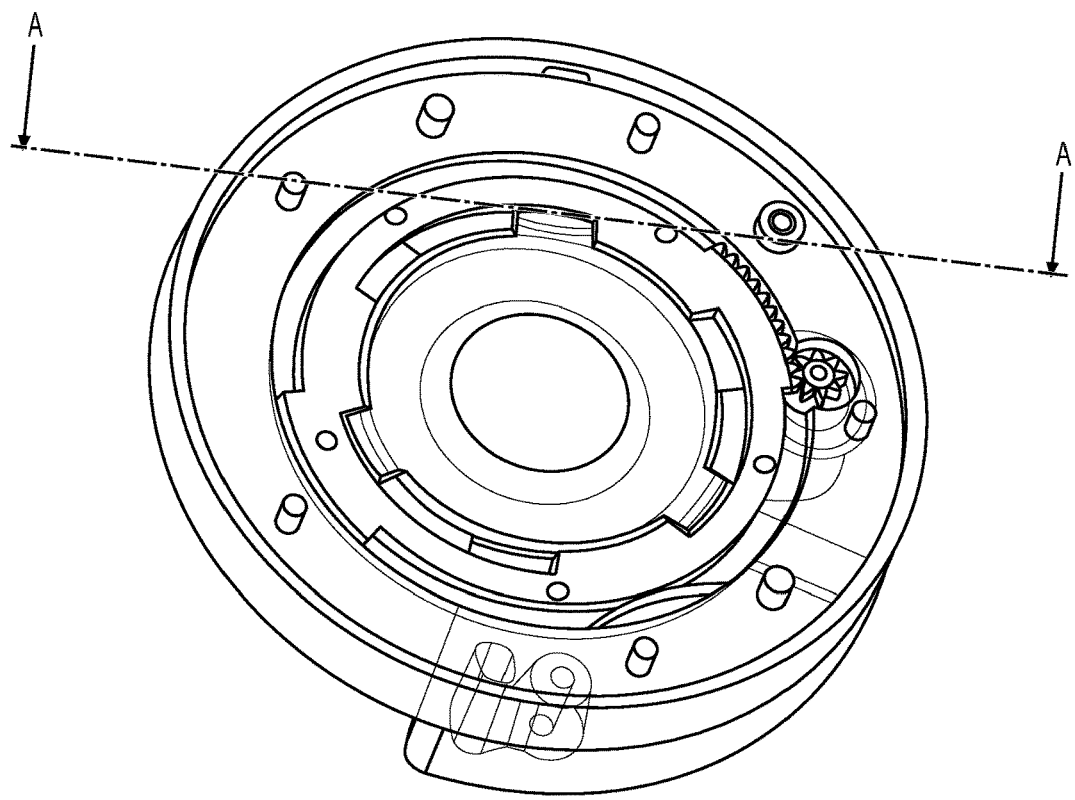
FIG. 12 is a diagram showing an example of the external perspective view of the base member, on which the rotation member is mounted.
Figure 13:
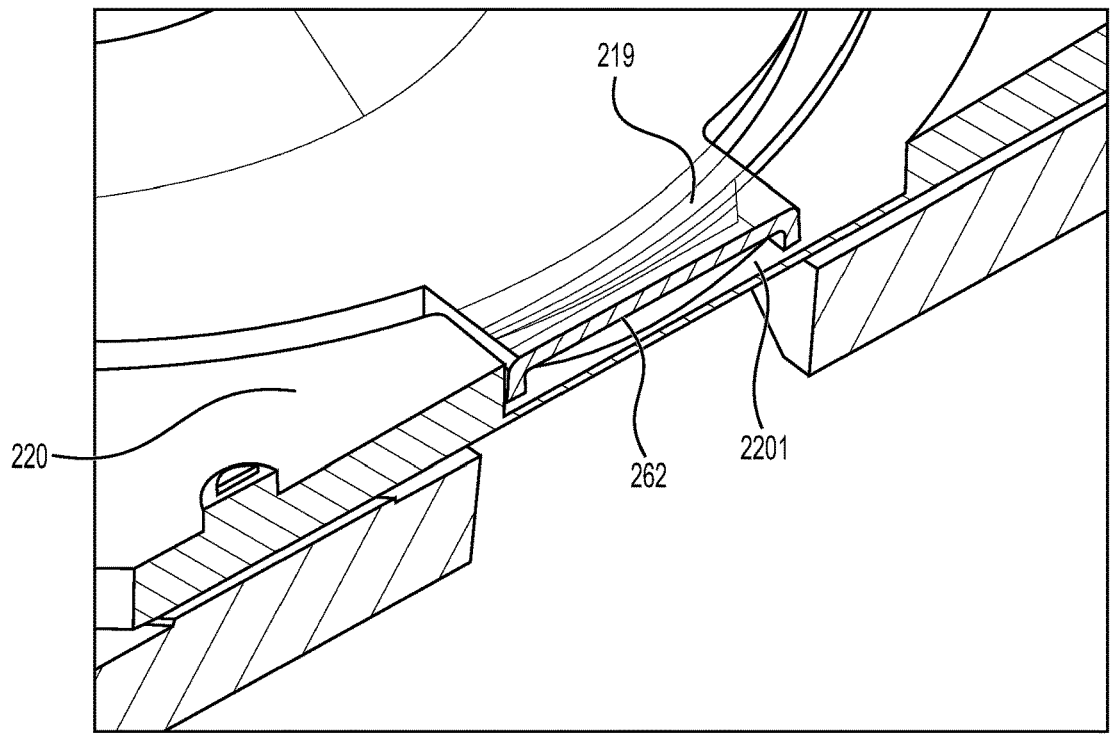
FIG. 13 shows an enlarged view, near a holding portion, of a cross section taken along the line A-A of FIG. 12.

FIG. 12 shows another example of the external perspective view of the light amount adjustment device 200 in a state where the cover 240 is removed. FIG. 13 shows an enlarged view, near the holding portion 219, of a cross section taken along the line A-A of FIG. 12. As shown in FIG. 13, an elastic member 262 may be provided between the holding portion 219 and the rotation member 220. The elastic member 262 may be provided between the holding portion 219 and the flange portion 2201. The elastic member 262 is configured to energize the rotation member 220 and suppress the rotation of the rotation member 220. The elastic member 262 is configured to press the first surface area, which has a rough surface and is facing the base member 210, of the rotation member 220 against the base member 210. Accordingly, the rotation of the rotation member 220 can be suppressed. The light amount adjustment device 200 may include at least one of the elastic member 260 or the elastic member 262.

As described above, according to the light amount adjustment device 200 of the present embodiment, the situation of the diaphragm blades 232 rotating due to the rotation of the rotation member 220 as a result of the impact, such that the amount of light cannot be appropriately adjusted, can be prevented. When the power to be supplied to the step motor 250 is suppressed, the unnecessary rotation of the diaphragm blades 232 can be suppressed.

The order of execution of each process, such as the operations, procedures, steps, stages, etc. in the device, system, program, and method shown in the claims, description, and drawings is not expressly stated in terms of "before", "prior", etc. It should be noted that the output of the previous process can be realized in any order as long as it is not used in later processing. For convenience, even an operation flow in the claims, description, and drawings is described using "first," "next," or the like. This does not mean that it is necessary to carry out execution in this order.

[Item 1] A light amount adjustment device, including:
a base member;
a rotation member that is rotatably held with respect to the base member; and
a light amount adjustment member, which is engaged with the rotation member and is driven by rotation of the rotation member so as to adjust the amount of passing light,
wherein the surface roughness of a first surface area, which is in contact with the base member, of the rotation member is greater than the surface roughness of a second surface area, which is not in contact with the base member, of the rotation member.

[Item 2] The light amount adjustment device of item 1,
wherein the rotation member is plate-shaped and is provided between the base member and the light amount adjustment member, and
the first surface area of the rotation member includes a surface facing the base member.

[Item 3] The light amount adjustment device of item 1,
wherein the rotation member is plate-shaped and is provided between the base member and the light amount adjustment member, and
the second surface area of the rotation member includes a surface facing the light amount adjustment member.

[Item 4] The light amount adjustment device of item 1,
wherein the base member includes a protrusion portion, to which the rotation member is rotatably fitted,
the rotation member is plate-shaped and is rotatably fitted to the protrusion portion of the base member, and
the first surface area of the rotation member includes a surface facing the protrusion portion of the base member.

[Item 5] The light amount adjustment device of item 1, further including: an elastic member for energizing the rotation member.

[Item 6]
The light amount adjustment device of item 5, wherein the elastic member presses the first surface area of the rotation member against the base member.

[Item 7] The light amount adjustment device of item 5,
wherein the base member includes a recessed portion that rotatably accommodates the rotation member, and
the elastic member is provided between a side wall of the recessed portion and a side surface which faces the side wall of the recessed portion, of the rotation member.

[Item 8] The light amount adjustment device of item 5,
wherein the base member includes a holding portion that rotatably clamps and holds the rotation member, and
the elastic member is provided between the holding portion and the rotation member.

[Item 9] The light amount adjustment device of item 5,
wherein the rotation member is provided between the base member and the light amount adjustment member, and is a plate-shaped annular member including an opening portion,
the base member includes a recessed portion that rotatably accommodates the rotation member, and a protrusion portion that is provided on the recessed portion and that protrudes from a bottom surface of the recessed portion so as to be rotatably fitted to the opening portion,
the first surface area of the rotation member includes a surface opposing the protrusion portion of the base member, and
the elastic member is provided between a side wall of the recessed portion and a side surface which faces the side wall of the recessed portion, of an outer circumferential side of the rotation member.

[Item 10] The light amount adjustment device of item 5,
wherein the rotation member is provided between the base member and the light amount adjustment member, and is a plate-shaped annular member including an opening portion,
the base member includes a recessed portion that rotatably accommodates the rotation member, and a protrusion portion that is provided on the recessed portion and that protrudes from a bottom surface of the recessed portion so as to be rotatably fitted to the opening portion,
the base member includes a holding portion that is provided on the protrusion portion and rotatably holds the rotation member,
the first surface area of the rotation member includes a surface facing the base member, and the elastic member is provided between the holding portion and the rotation member.

[Item 11] The light amount adjustment device of item 1, wherein the rotation member includes:
a main body portion;
a gear portion, which is provided on the main body portion and is configured to receive a driving force from a driving source; and
a weight portion that is provided on the main body portion, and
the position of the combined center of gravity of the main body portion, the gear portion and the weight portion is closer to a rotation shaft of the rotation member than the position of the combined center of gravity of the main body portion and the gear portion.

[Item 12] The light amount adjustment device of item 1, wherein the light amount adjustment member is a diaphragm portion including a plurality of diaphragm blades.

[Item 13] A light amount adjustment device, including:
a rotation member;
a light amount adjustment member, which is engaged with the rotation member and is driven by the rotation of the rotation member to adjust the amount of passing light, and
an elastic member, which is configured to suppress the rotation of the rotation member and energize the rotation member.

[Item 14] The light amount adjustment device of item 13, further including:
a base member,
wherein the rotation member is rotatably held with respect to the base member, and
the elastic member is provided between the base member and the rotation member.

[Item 15] The light amount adjustment device of item 14, wherein the base member includes a recessed portion that rotatably accommodates the rotation member, and
the elastic member is provided between a side wall of the recessed portion and a side surface, which faces the side wall of the recessed portion, of the rotation member.

[Item 16] The light amount adjustment device of item 14, wherein the base member includes a holding portion that rotatably clamps and holds the rotation member, and
the elastic member is provided between the holding portion and the rotation member.

[Item 17] The light amount adjustment device of item 15, wherein the rotation member is provided between the base member and the light amount adjustment member, and is a plate-shaped annular member including an opening portion,
the base member includes a recessed portion that rotatably accommodates the rotation member, and a protrusion portion that is provided on the recessed portion and that protrudes from a bottom surface of the recessed portion so as to be rotatably fitted to the opening portion, and
the elastic member is provided between a side wall of the recessed portion and a side surface, which faces the side wall of the recessed portion, of an outer circumferential side of the rotation member.

[Item 18] The light amount adjustment device of item 15, wherein the rotation member is provided between the base member and the light amount adjustment member, and is a plate-shaped annular member including an opening portion,
the base member includes a recessed portion that rotatably accommodates the rotation member, and a protrusion portion that is provided on the recessed portion and that protrudes from a bottom surface of the recessed portion so as to be rotatably fitted to the opening portion, the base member includes a holding portion that is provided on the protrusion portion and rotatably holds the rotation member, and
the elastic member is provided between the holding portion and the rotation member.

[Item 19] The light amount adjustment device of item 13, wherein the rotation member includes:
a main body portion;
a gear portion, which is provided on the main body portion and is configured to receive a driving force from a driving source; and
a weight portion that is provided on the main body portion, and
the position of the combined center of gravity of the main body portion, the gear portion and the weight portion is closer to a rotation shaft of the rotation member than the position of the combined center of gravity of the main body portion and the gear portion.

[Item 20] A light amount adjustment device, including:
a rotation member;
a light amount adjustment member, which is engaged with the rotation member and is driven by the rotation of the rotation member to adjust the amount of passing light,
wherein the rotation member includes:
a main body portion;
a gear portion, which is provided on the main body portion and is configured to receive a driving force from a driving source; and
a weight portion that is provided on the main body portion, and
the position of the combined center of gravity of the main body portion, the gear portion and the weight portion is closer to a rotation shaft of the rotation member than the position of the combined center of gravity of the main body portion and the gear portion.

[Item 21]
The light amount adjustment device of item 20, wherein the distance between a line, obtained by projecting a vertical line passing through the center of gravity of the rotation member onto a plane perpendicular to the rotation shaft of the rotation member, and an intersection point of the plane and the rotation shaft of the rotation member is shorter than the distance between a line, obtained by projecting a horizontal line passing through the center of gravity of the rotation member onto the plane, and the intersection point.

[Item 22]
The light amount adjustment device of item 20, wherein the position of the center of gravity of the rotation member is on the rotation shaft of the rotation member.

[Item 23] The light amount adjustment device of item 20, wherein the gear portion includes a punched portion.

[Item 24] An imaging device, including:
the light amount adjustment device of any one of items 1 to 23; and
an image sensor configured to form an image of light passing through the light amount adjustment device.

[Item 25] An imaging system, including:
the imaging device of item 24; and
a supporting mechanism configured to support the imaging device.

[Item 26] A moving object, including:
the imaging system of item 25 and which is configured to move.

DESCRIPTION OF REFERENCE NUMERALS

10 UAV
20 UAV main body

50 Gimbal
60 Imaging device
100 Imaging device
200 Light amount adjustment device
210 Base member
212 Recessed portion
214 Protrusion portion
216 Supporting pin
217 Fixed pin
218 Opening portion
219 Holding portion
220 Rotation member
221 Main body portion
222 Opening portion
224 Gear portion
226 Weight portion
227 Punched portion
2201 Flange portion
2202 Notch portion
2221 Guide pin
230 Diaphragm portion
232 Diaphragm blade
240 Cover
250 Step motor
252 Gear portion
260 Elastic member
262 Elastic member
300 Remote control device

What is claimed is:

1. A light amount adjustment device, comprising:
a base member;
a rotation member rotatably held with respect to the base member, the rotation member including a first surface area in contact with the base member and a second surface area not in contact with the base member, and a surface roughness of the first surface area being greater than a surface roughness of the second surface area; and
a light amount adjustment member engaged with the rotation member and configured to be driven by the rotation member to adjust an amount of passing light, wherein:
the rotation member includes:
a main body portion;
a gear portion provided at the main body portion and configured to engage with a driving source; and
a weight portion provided at the main body portion; and
a position of a center of gravity of a combination of the main body portion, the gear portion, and the weight portion is closer to a rotation shaft of the rotation member than a position of a center of gravity of a combination of the main body portion and the gear portion.

2. The light amount adjustment device of claim 1, wherein:
the rotation member is plate-shaped and is provided between the base member and the light amount adjustment member; and
the first surface area of the rotation member includes a surface facing the base member.

3. The light amount adjustment device of claim 1, wherein:
the rotation member is plate-shaped and is provided between the base member and the light amount adjustment member; and
the second surface area of the rotation member includes a surface facing the light amount adjustment member.

4. The light amount adjustment device of claim 1, wherein:
the base member includes a protrusion portion;
the rotation member is plate-shaped and is rotatably fitted to the protrusion portion of the base member; and
the first surface area of the rotation member includes a surface facing the protrusion portion of the base member.

5. The light amount adjustment device of claim 1, further comprising:
an elastic member configured to energize the rotation member.

6. The light amount adjustment device of claim 5, wherein the elastic member presses the first surface area of the rotation member against the base member.

7. The light amount adjustment device of claim 5, wherein:
the base member includes a holding portion that rotatably clamps and holds the rotation member; and
the elastic member is provided between the holding portion and the rotation member.

8. The light amount adjustment device of claim 5, wherein:
the rotation member is provided between the base member and the light amount adjustment member, and the rotation member includes a plate-shaped annular member including an opening portion;
the base member includes:
a recessed portion that rotatably accommodates the rotation member; and
a protrusion portion provided at the recessed portion and protruding from a bottom surface of the recessed portion, the protrusion portion being rotatably fitted to the opening portion;
the first surface area of the rotation member includes a surface facing the protrusion portion of the base member; and
the elastic member is provided between a side wall of the recessed portion and a side surface of an outer circumferential side of the rotation member that faces the side wall of the recessed portion.

9. The light amount adjustment device of claim 5, wherein:
the rotation member is provided between the base member and the light amount adjustment member, and the rotation member includes a plate-shaped annular member including an opening portion;
the base member includes:
a recessed portion that rotatably accommodates the rotation member;
a protrusion portion provided at the recessed portion and protruding from a bottom surface of the recessed portion, the protrusion portion being rotatably fitted to the opening portion; and
a holding portion provided at the protrusion portion and rotatably holding the rotation member;
the first surface area of the rotation member includes a surface facing the base member; and
the elastic member is provided between the holding portion and the rotation member.

10. The light amount adjustment device of claim 1, wherein the light amount adjustment member includes a diaphragm portion including a plurality of diaphragm blades.

11. A light amount adjustment device of, comprising:
a base member;
a rotation member rotatably held with respect to the base member, the rotation member including a first surface area in contact with the base member and a second surface area not in contact with the base member, and a surface roughness of the first surface area being greater than a surface roughness of the second surface area;
a light amount adjustment member engaged with the rotation member and configured to be driven by the rotation member to adjust an amount of passing light; and
an elastic member configured to energize the rotation member, wherein:
the base member includes a recessed portion that rotatably accommodates the rotation member; and
the elastic member is provided between a side wall of the recessed portion and a side surface of the rotation member that faces the side wall of the recessed portion.

* * * * *